United States Patent [19]
Bates

[11] Patent Number: 6,128,819
[45] Date of Patent: Oct. 10, 2000

[54] METHOD FOR ENHANCING ENGINE PERFORMANCE IN TWO-STROKE ENGINES

[75] Inventor: Gregory M. Bates, Lakeville, Minn.

[73] Assignee: Works Racing, Inc., Lakeville, Minn.

[21] Appl. No.: 09/122,948

[22] Filed: Jul. 27, 1998

[51] Int. Cl.$^7$ ............................................ B23P 15/00
[52] U.S. Cl. ............................. 29/888.011; 29/402.4
[58] Field of Search ........................... 29/888.011, 402.4; 123/626

[56] References Cited

U.S. PATENT DOCUMENTS

| | | |
|---|---|---|
| 1,322,245 | 11/1919 | Klassen . |
| 2,011,484 | 8/1935 | Harman .................................. 29/156.4 |
| 2,361,701 | 10/1944 | Michaels ................................... 29/148 |
| 2,482,925 | 9/1949 | Mercer ...................................... 29/148 |
| 2,649,650 | 8/1953 | Javor ........................................ 29/148 |
| 2,713,716 | 7/1955 | Treadwell ................................. 29/402 |
| 4,599,781 | 7/1986 | Diperstein ............................ 29/402.11 |
| 5,941,222 | 8/1999 | Braly .................................... 29/888.01 |

*Primary Examiner*—Irene Cuda
*Attorney, Agent, or Firm*—Arnold White & Durkee

[57] ABSTRACT

A system for enhancing performance in a two-stroke engine. An access aperture is formed in the exterior wall of an air passage associated with a cylinder within the two-stroke engine. The air passage is then modified, in one embodiment, by inserting an automated modification tool through the access aperture and operating the automated modification tool according to a computer controlled program to modify the air flow characteristics of the air passage. The access aperture in the exterior wall is thereafter closed.

26 Claims, 13 Drawing Sheets

METHOD FOR ENHANCING ENGINE PERFORMANCE IN TWO-STROKE ENGINES

BACKGROUND OF THE INVENTION

1. Field of the Invention

This invention relates generally to reworking engines for improved performance and, more particularly, to an improved system for modifying the air flow characteristics of air passages within a two-stroke engine for enhanced engine performance.

2. Discussion of the Prior Art

Over time, the racing industry has experienced a proliferation of fan support and substantial diversification in the types of vehicles involved in racing. A particularly active area within the racing industry involves vehicles powered by two-stoke engines, including but not limited to motorcycles, snowmobiles, personal watercraft, all terrain vehicles (ATV), and karts. A drawback exists, however, in that the air passages in original production cylinders have a standard shape and dimension which, in practice, limits the performance of such two-stroke engines. With an ever increasing premium placed on speed and performance, it is therefore desirable to modify the air flow characteristics of air passages within two-stroke engines to enhance the overall performance capabilities of such vehicles.

One prior art technique for modifying the air passages of two-stroke engines involves manually altering the air passages with hand-tools. While generally effective at modifying the dimension of the air passages for improved engine performance, this technique nonetheless suffers from a host of significant drawbacks. A major disadvantage stems from the fact that the air passages are generally L-shaped with a generally vertical upper portion and generally horizontal lower portion. The generally vertical upper portion of each air passage is readily accessible when the cylinder head is removed, which thereby avails the inner dimensions of the upper portion for modification via inserting and working hand tools within the upper portion. The lower portion of each air passage, on the contrary, extends in a generally horizontal fashion inward toward the cylinder such that hand tools cannot optimally be inserted and worked within the lower portion. As such, the only modifications that can be effectively performed on the air passages are those within the generally vertical upper portion and a limited section of the horizontal lower portion. This disadvantageously restricts the extent to which the overall air flow characteristics of the air passages can be modified, thereby limiting the performance of the two-stroke engine.

A host of further drawbacks stem from the hand-crafting process employed within the aforementioned prior art air passage modification technique. One drawback is that it is extremely difficult to produce consistent results within the air passages given the inherent variations of the hand-crafting process. The process of manually modifying the air passages is also disadvantageously time consuming which, consequently, translates into increased labor and production costs. Labor costs are also heightened under this manual technique due to the fact that the workers conducting the hand-crafting must necessarily be highly trained and skilled to effectuate precise modifications within the air passages.

A need therefore exists for an improved system for modifying the air flow characteristics of air passages within two-stroke engines for enhanced engine performance.

SUMMARY OF THE INVENTION

The present invention provides the desired improvement by providing a method of enhancing the performance of a two-stroke engine, wherein the engine has a cylinder, an air passage in fluid communication with the cylinder, and an exterior wall forming one boundary of the air passage. The first step involves forming an access aperture in the exterior wall. The second step involves modifying the air flow characteristics of the air passage. The third step involves closing the access aperture in the exterior wall.

The present invention also provides the desired improvement by providing a system for increasing the horsepower in a two-stroke engine. The system includes an aperture former for forming an access aperture through an exterior wall forming a boundary of an air passage associated with a cylinder of the two-stroke engine. The system further includes an air passage modification system for modifying an internal surface of the air passage to increase the volume of the air passage. The air passage modification system includes a modification tool, a positioner for positioning the modification tool, and a controller having predetermined operational parameters for controlling the operation of the modification tool and the positioner. The system also includes an aperture sealer for sealing the access aperture in the exterior wall.

In yet another broad aspect, the present invention provides the desired improvement by providing a method of modifying a stock two-stroke engine for enhanced performance, comprising the steps of: (a) forming an access aperture in an air passage which delivers air to a cylinder; (b) modifying the airflow characteristics of the air passage to produce a predetermined engine performance enhancement; and (c) closing the access aperture.

BRIEF DESCRIPTION OF THE DRAWINGS

The advantages of the present invention will become apparent from the following detailed description of a preferred embodiment, wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As well known to those skilled in the art, two-stroke engines are internal combustion engines in which two strokes of a piston are required to complete a cycle, one stroke to admit and compress air or an air-fuel mixture within the cylinder and one stroke to ignite fuel, do work, and scavenge the cylinder. One or more air passages are typically associated with each cylinder for admitting air and/or an air-fuel mixture into the particular cylinder. Each air passage includes an entrance aperture in fluid communication with an air inlet and an exit aperture in fluid communication with the interior of the cylinder. Between the entrance and exit apertures, the air passages extend in a generally L-shaped manner with a generally vertical upper portion and a horizontal lower portion. The upper portion of the air passage extends downward from the top of the cylinder block, generally parallel to the interiorly disposed cylinder, for connection to generally horizontal lower portion. The lower portion of the air passage extends inward for connection with the interior of the cylinder.

The present invention provides the ability to modify the physical shape and dimensions of the entire air passage, including both the upper and lower portions, such that the air flow characteristics of the air passage can be selectively adjusted to achieve a desired engine performance enhancement. For example, the air flow characteristics of the air passages can be adjusted according to the present invention to: (1) increase the horsepower of the engine; (2) increase the torque of the engine; (3) increase the volume of air flowing into the cylinder; (4) restrict the volume of air flowing into the cylinder; (5) direct the flow of air and/or an air-fuel mixture into predetermined areas within the cylinder; and (6) alter the timing when the piston opens and closes the exit aperture of the air passage. These and other modifications can be accomplished pursuant to the present invention to enhance engine performance.

Figure 1:
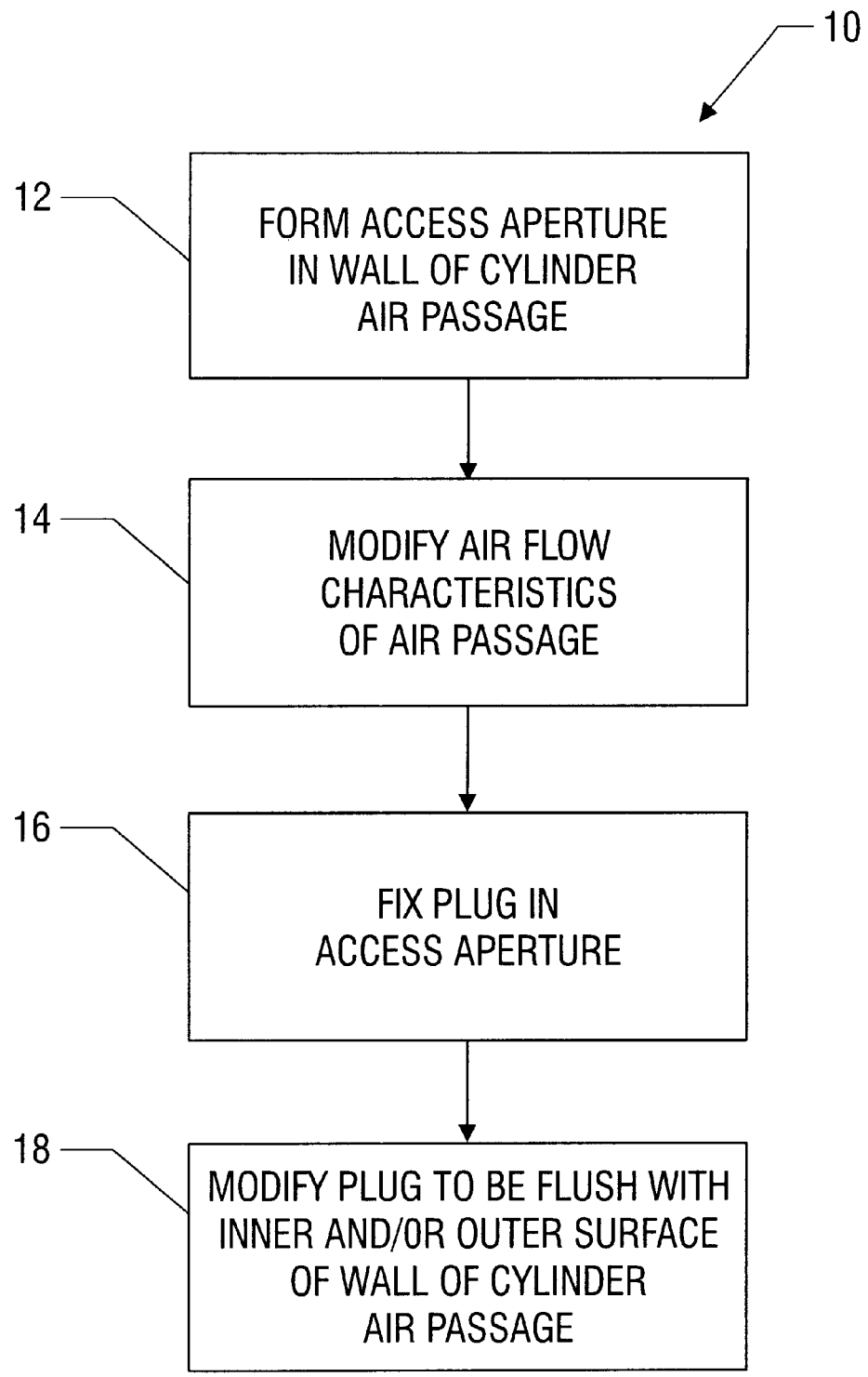
FIG. 1 is a block diagram illustrating the steps in the method of enhancing engine performance in two-stroke engines according to the present invention.

Referring to FIG. 1, shown is a block diagram illustrating the steps in the method of enhancing performance in two-stroke engines according to one embodiment of the present invention. The method 10 involves a first step 12 of forming an access aperture through an exterior wall of an air passage associated with a cylinder of the two-stroke engine. A second step 14 involves modifying the air flow characteristics of the air passage. As will be set forth in greater particularity below, this can be accomplished by positioning and/or directing the operation of an automated modification tool and/or a manual modification tool within the air passage via the access aperture formed in step 12 and the entrance aperture. A third step 16 involves sealing the access aperture which, in one embodiment, may be accomplished by fixing a plug within the access aperture. An optional fourth step 18 may further be performed which involves modifying the plug such that it is flush with the contours of the inner and/or outer surface of the wall of the air passage.

Figure 3:
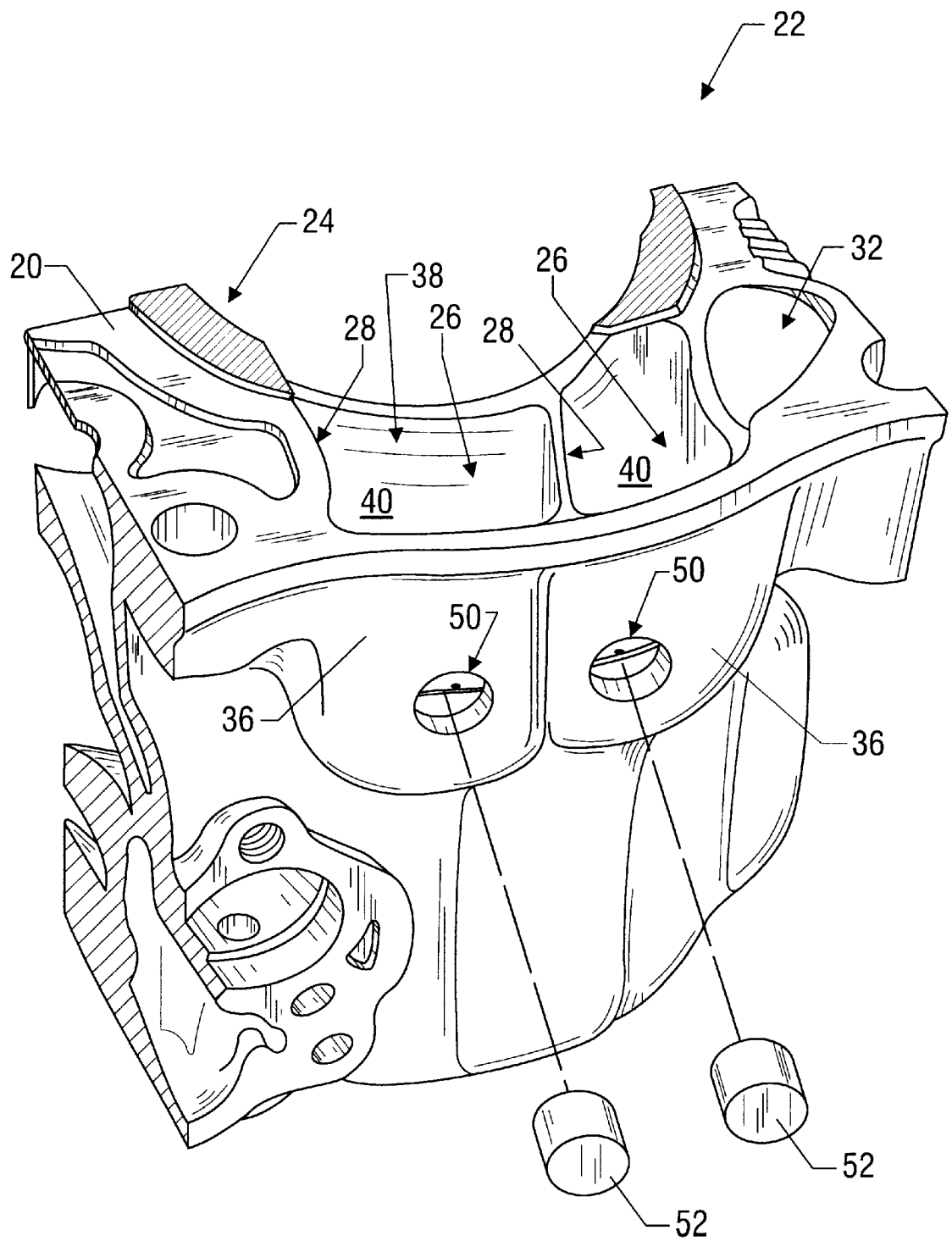
FIG. 3 is an outside perspective view of one cylinder block (cut in half) of a two-stroke engine capable of being modified according to the method of the present invention.
Figure 4:
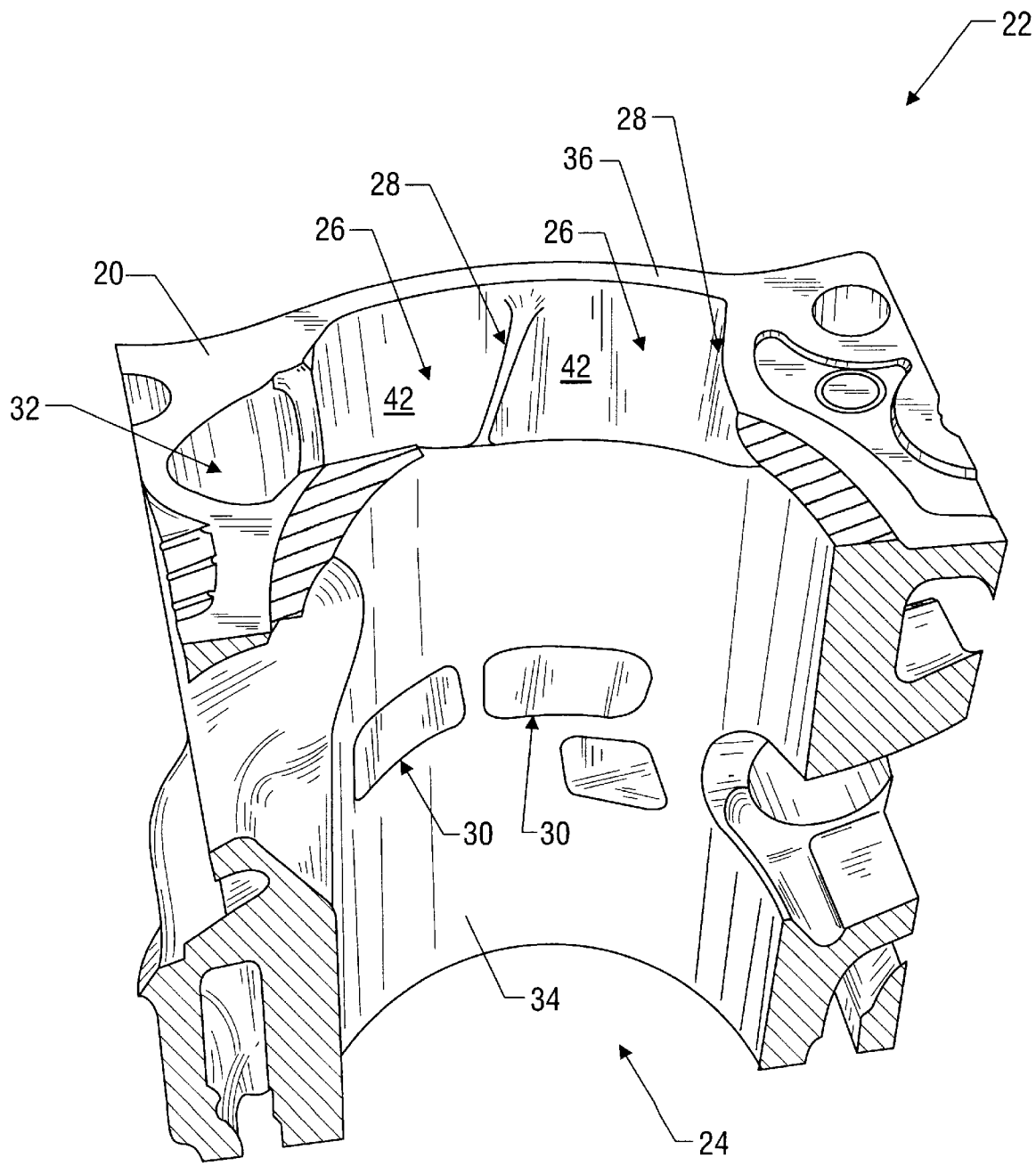
FIG. 4 is an inside perspective view of the cylinder block shown in FIG. 3

Referring to FIGS. 3 and 4, shown is a perspective of a cylinder block 20 of a two-stroke engine 22. In the interest of clarity, the cylinder block 20 is shown having only one cylinder, shown generally at 24, which has been cut in cross-section down the middle. The cylinder block 20, which is shown by way of example and not to be deemed limiting as to the present invention, includes a plurality of air passages 26 for delivering air into the cylinder 24. Each air passage 26 includes an entrance aperture, shown generally at 28, formed at the top of the cylinder block 20 and an exit aperture, shown generally at 30, formed proximate the middle of the cylinder 24. The entrance aperture 28 of each air passage 26 is in fluid communication with an air inlet 32 such that an incoming airflow can be directed into each air passage 26. The exit aperture 30 is in fluid communication with an interior surface 34 of the cylinder 24 such that the airflow within the air passages 26 can be directed into the cylinder 24 and mixed with fuel for eventual combustion.

The air passages 26 are bounded by an external wall 36 that extends along the outermost region of the cylinder block 20 and an internal wall 38 that extends away from the interior surface 34 of the cylinder 24. For purposes of clarity, the air passages 26 are defined as including an inner passage surface 40 extending along the internal wall 38 and an outer passage surface 42 extending along the interior of the external wall 36. As will be shown in greater detail below, the shape of the air passages 26 at manufacture is fixed, thereby presenting a limitation on the amount of air that can be delivered into the cylinder 24 during each stroke. Furthermore, the configuration of the inner passage surface 40 and outer passage surface 42 causes each air passage 26 to take the form of a generally L-shaped passageway between the entrance and exit apertures 28, 30, which disadvantageously restricts access to the lower portion of the air passages 26.

Figure 5:
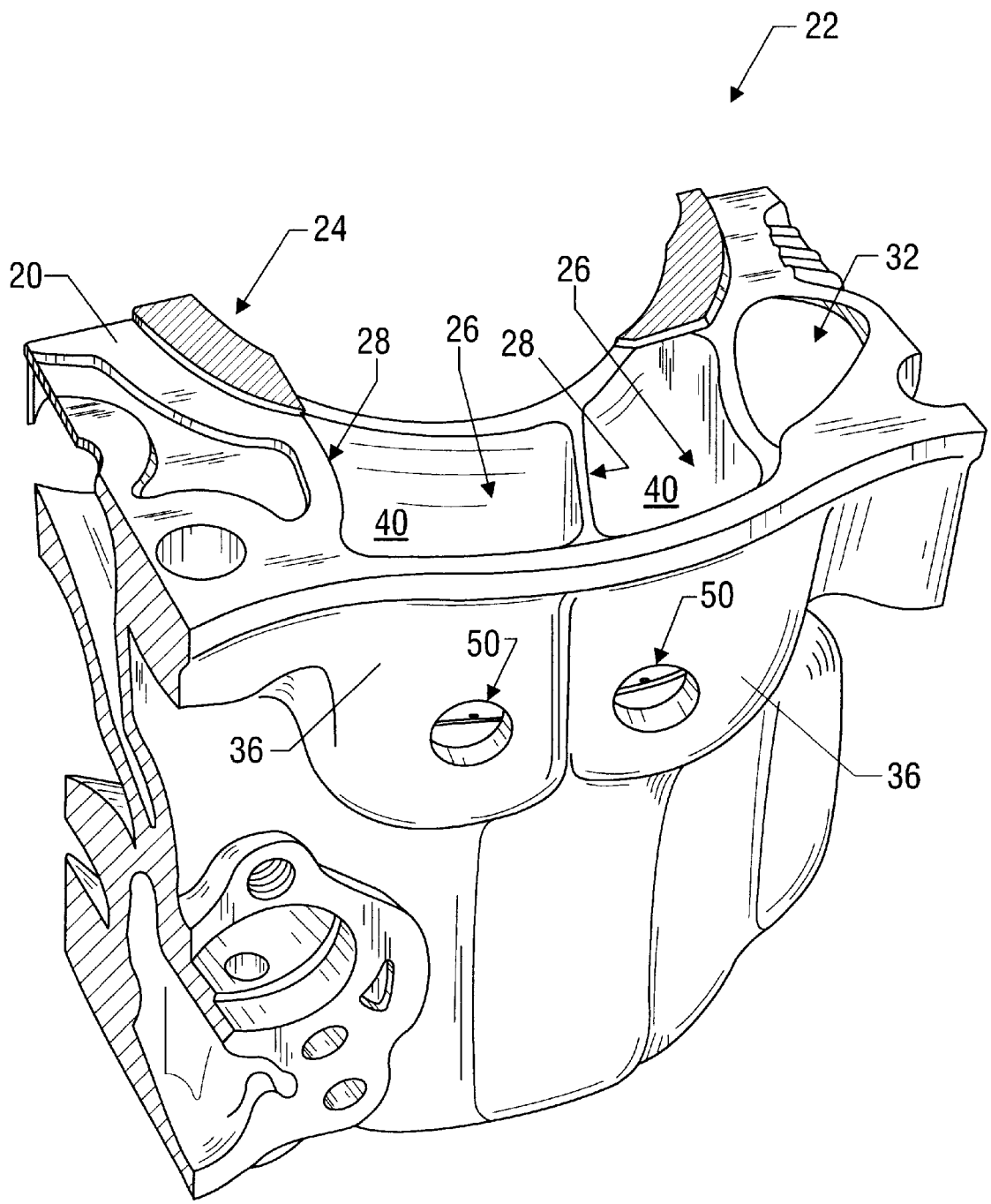
FIG. 5 is an outside perspective view of the cylinder block shown in FIG. 3 showing an access aperture formed in the exterior wall of each air passage.
Figure 18:
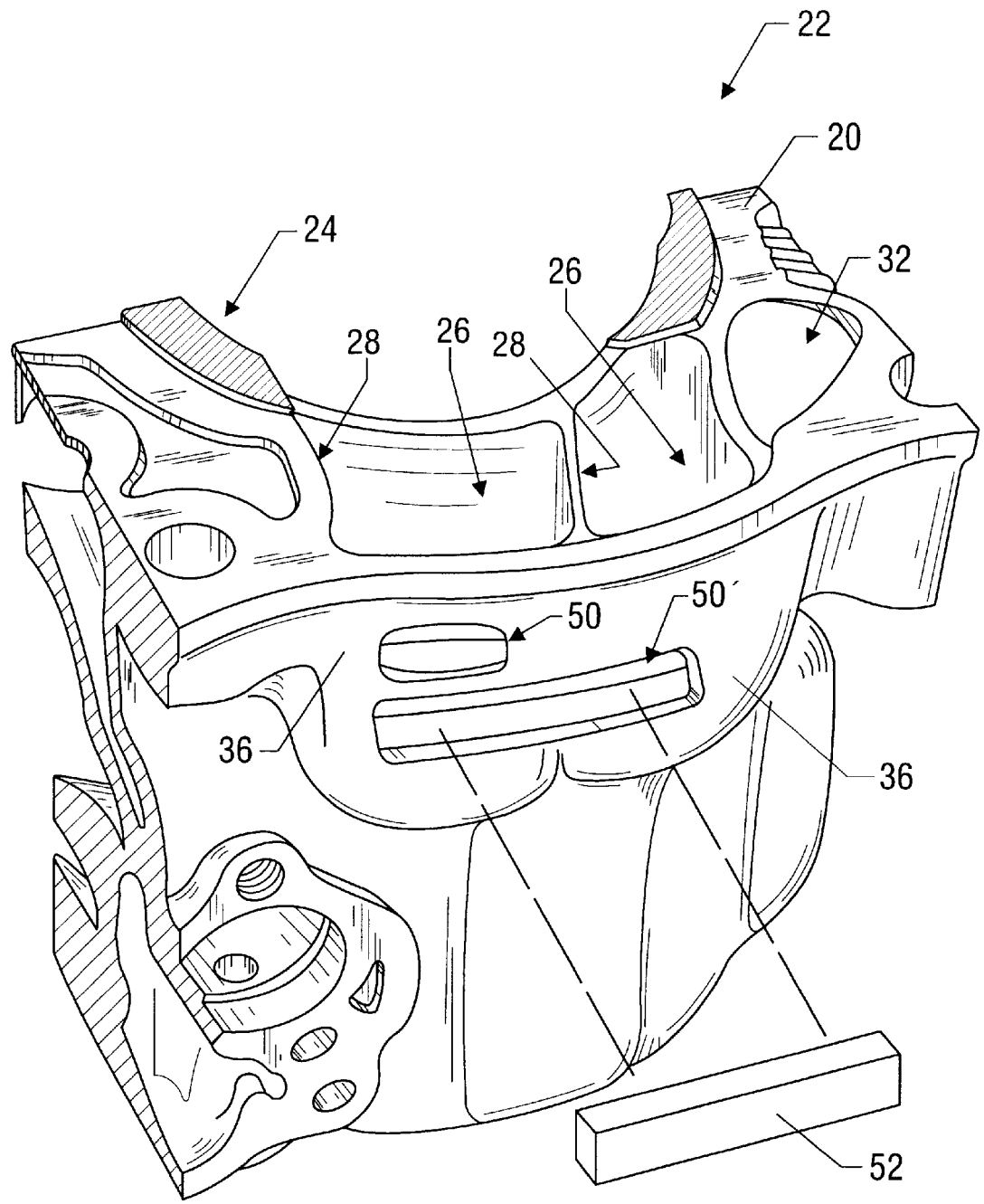
FIG. 18 is an outside perspective view of a cylinder block illustrating the formation of multiple access apertures within a single air passage and the formation of a single access aperture extending over multiple air passages.

With combined reference to FIGS. 3 and 5, the first step 12 of the method of enhancing two-stroke engine performance of the present invention involves forming an access aperture 50 through the external wall 36 to provide access to each air passage 26 that is to be modified according to the present invention. By way of example, FIG. 3 illustrates this being accomplished by removing a section 52 of the external wall 36, such as can be performed via any number of well known and commercially available cutting instruments. It is to be understood that each access aperture 50 may furthermore be formed via any number of alternate means for forming an aperture, including but not limited to the use of well known and commercially available drills, grinders, lasers, and later-developed technologies. Moreover, while the access aperture 50 is shown in the shape of a circle, it is to be understood that this is presented by way of example and not limitation such that the access aperture 50 may take any number of different shapes, including but not limited to that of a rectangular (see FIG. 18), a square, an oval, and an ellipse. With further reference to FIG. 18, it is also within the scope of the present invention to form a single access aperture 50' extending across multiple air passages 26, as well as forming multiple access apertures 50, 50' within a single air passage 26.

Figure 6:
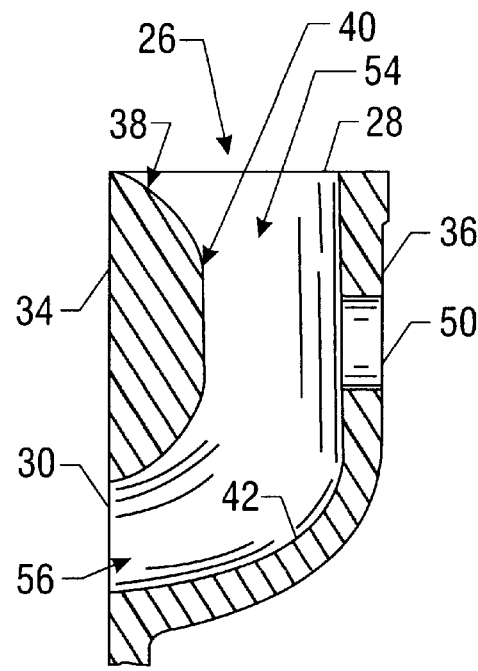
FIG. 6 is a partial sectional view illustrating a cylinder air passage prior to being modified according to the method of the present invention.
Figure 7:
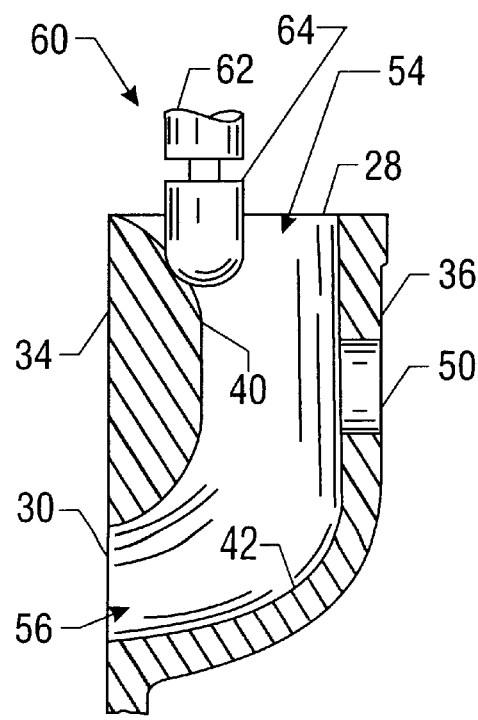
FIGS. 7–11 are partial sectional views illustrating the cylinder air passage shown in FIG. 6 with a modification tool inserted through an entrance aperture for modifying the generally vertical upper portion of the air passage.
Figure 8:
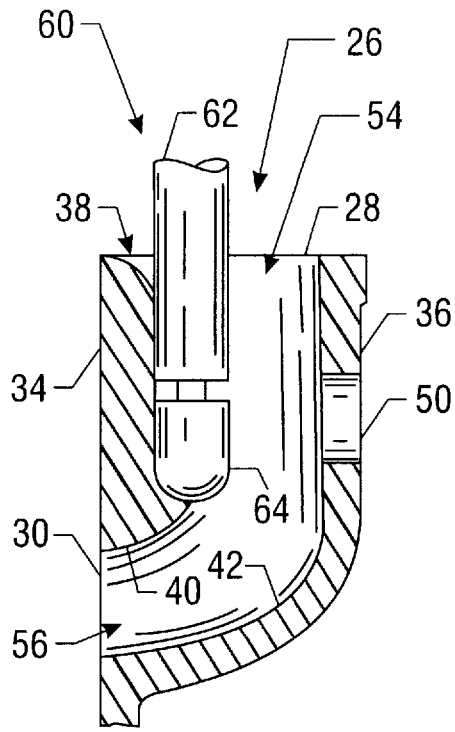
Figure 9:
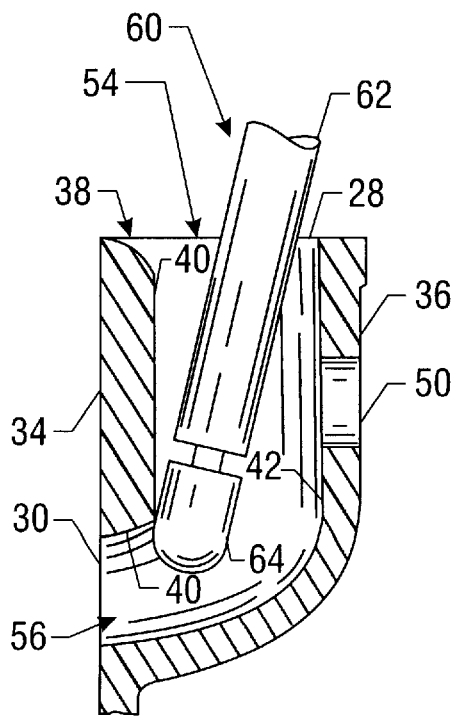
Figure 10:
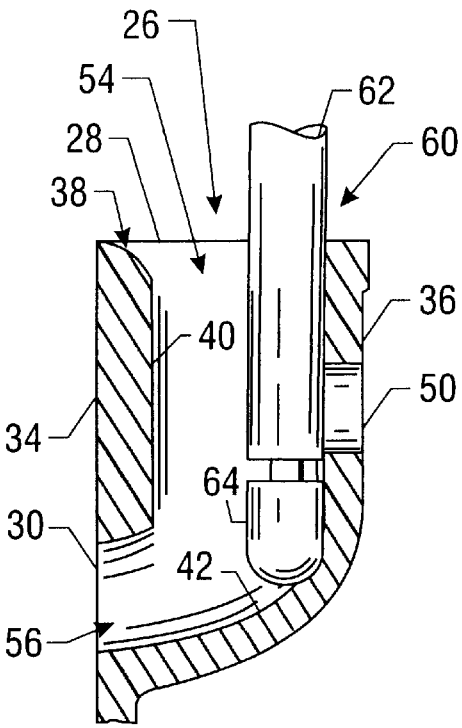
Figure 11:
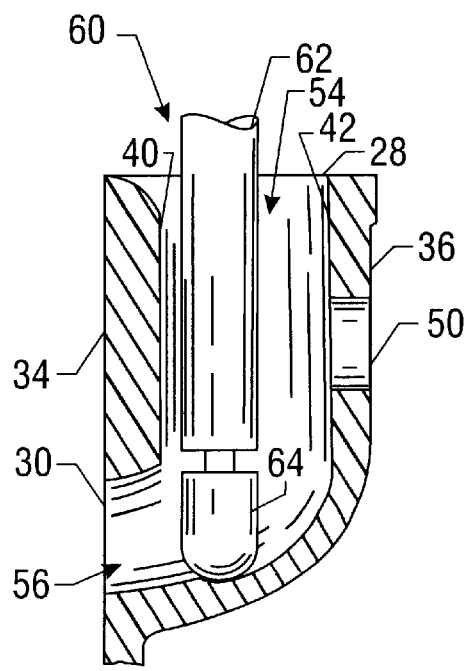

With reference to FIG. 6, the access aperture 50 advantageously provides a port through which the air passage 26 can be accessed. This is important from the standpoint of allowing the air passage 26 to be modified along its entire length to provide greater latitude in adjusting the airflow characteristics of the air passage to achieve a desired engine performance enhancement. To further explain, the air passage 26 extends in a generally L-shaped manner, including a generally vertical upper portion 54 and a generally horizontal lower portion 56. The upper portion 54 of the air passage 26 extends downward from the top of the cylinder block 20, generally parallel to the interiorly disposed cylinder 24, for connection to lower portion 56. The lower portion 56 of the air passage 26 extends inward for connection with the interior surface 34 of the cylinder 24. The air passage 26 is shown in FIG. 6 prior to modification according to the present invention, having standard inner dimensions which causes the air passage 26 to have standard or "stock" airflow characteristics for standard engine performance.

Referring further to FIGS. 7–14, the second step 14 of the present invention involves modifying the airflow characteristics of the air passage 26 to achieve a desired engine performance enhancement. The following embodiment is described below employing an automated modification tool 60 to effectuate the desired dimensional modifications within the air passage 26. However, it is to be readily understood that any number of well known manual modification tools may also be employed to effectuate the desired dimensional modifications within the air passage 26, including but not limited to now-known and/or later-developed hand tools which can be introduced into the air passage 26 through the entrance aperture 38 and the access aperture 50. These manual modification tools may be employed alone or in combination the automated modification tool 60 shown to obtain the desired airflow characteristics within the air passage 26.

In the embodiment shown, the step of modifying the airflow characteristics of the air passage 26 is accomplished by inserting the automated modification tool 60 into the air passage 26 (via the entrance aperture 38 and the access aperture 50) and manipulating the modification tool 60 to effectuate the desired dimensional modification within the air passage 26. The automated modification tool 60 is shown, by way of example only, including a handle member 62 with a rotating modification head 64 coupled thereto. The automated modification tool 60 may be controlled and positioned within the air passage 26 manually and/or automatically. For manual operation, the modification tool 60 may be hand-held, such as a Dremel tool, such that a machinist can manually position and manipulate the modification tool 60 within the air passage 26.

Figure 2:
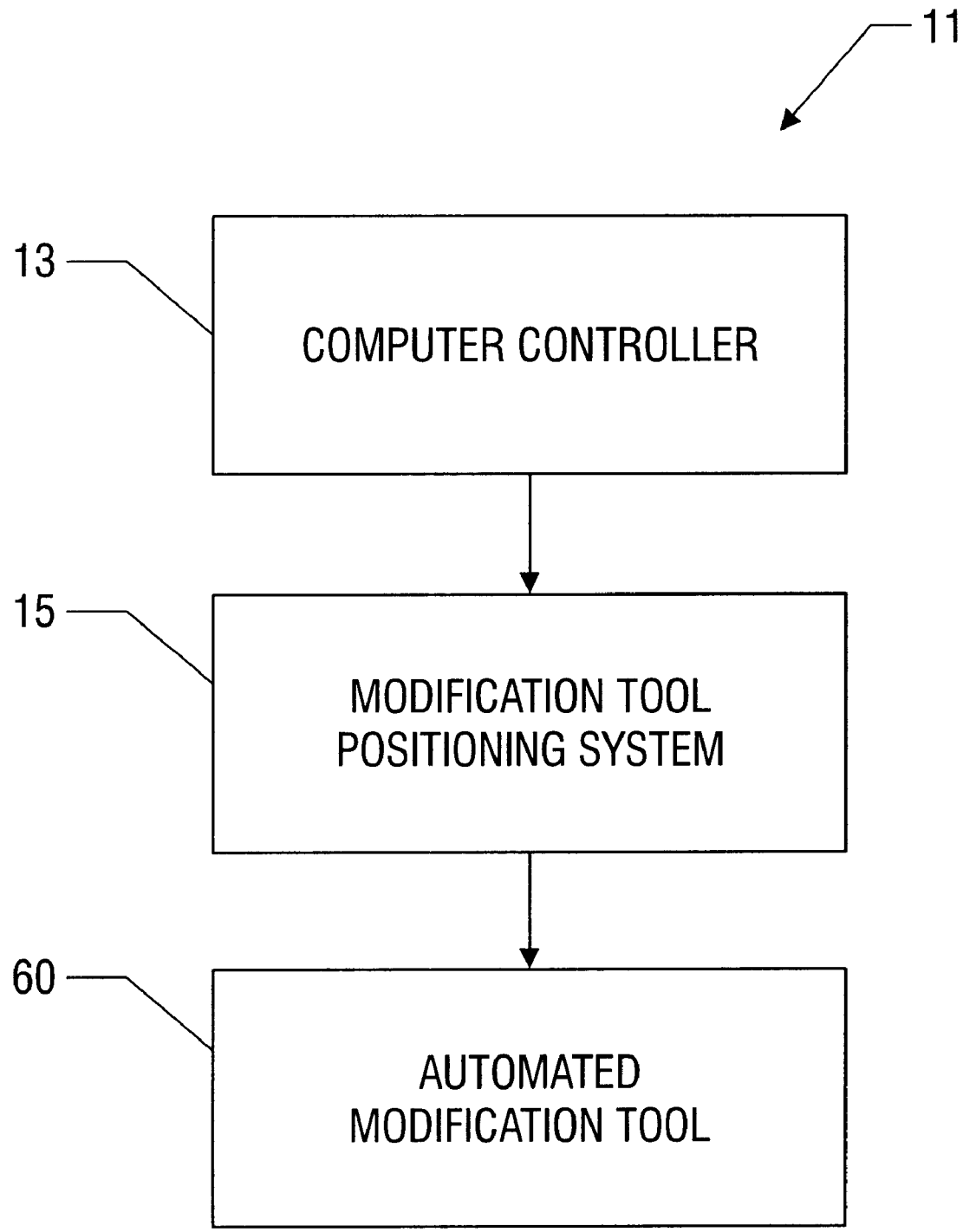
FIG. 2 is a block diagram illustrating the fundamental components of the apparatus for enhancing engine performance in two-stroke engines according to the present invention.

For automatic operation, the modification tool 60 may be part of a dedicated air passage modification system, such as designated generally at 11 in FIG. 2. In one embodiment, the air passage modification system 11 includes a computer controller 13 operatively coupled to a modification tool positioning system 15 which is, in turn, operatively coupled to the automated modification tool 60. The computer controller 13 may be one of a variety of commercially available computer controllers. The computer controller 13 is preferably be equipped with sufficient RAM and/or ROM memory for storing predetermined operational parameters which control the operation of the positioning system 15 and automated modification tool 60. The positioning system 15 may comprise any number of different means by which the automated modification tool 60 may be selectively positioned within the air passage, including but not limited to a positioning assembly having one or more of mechanical positioning means, pneumatic positioning means, hydraulic positioning means, and electromechanical positioning means. The automated modification tool 60 may comprise any number of suitable means for modifying the interior surfaces within an air passage, including but not limited to well known and commercially available automated machining instruments (such as an end mill, a drill bit, a boring tool, or a reamer), electrical discharge machining instruments, laser-based machining instruments, and later-developed technologies.

The automated modification tool 60, under the direction of the computer controller 13 and the positioning system 15, is thereby capable of modifying the inner dimensions of the air passage 26 to thereby alter the airflow characteristics thereof to achieve a desired engine performance enhancement. Under such an arrangement, the modification tool 60 is controlled in a precise and repeatable fashion via the modification tool positioning system 15 which, together with the computer controller 13, controls and positions the automated modification tool 60 within the air passage 26 according to the predetermined operational parameters stored in the computer controller 13. For example, the predetermined operational parameters may be selected to dictate the rotation speed of the modification head 64, as well as the manner in which the automated modification tool 60 is made to traverse within the upper and lower portions 54, 56 to thereby modify the entire inner dimension of the air passage 26.

Figure 19:
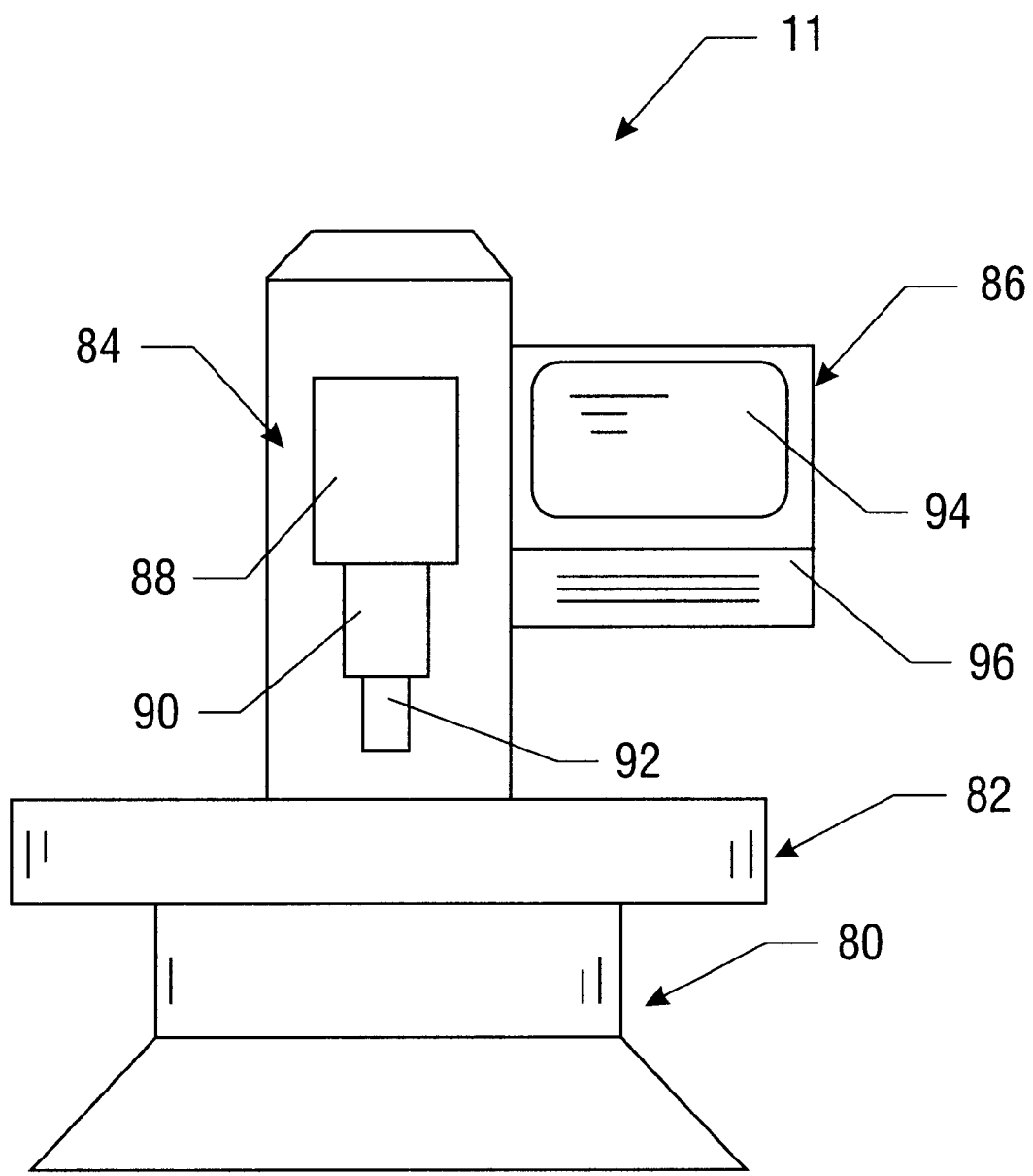
FIG. 19 is a side elevation illustrating, by way of example and not limitation, one embodiment of the air passage modification system 11 shown in FIG. 2.

FIG. 19 illustrates, by way of example and not limitation, one embodiment of the air passage modification system 11 shown in FIG. 2. The air passage modification system 11 takes the form of a machine tool arrangement having a base 80, an X-Y-Z positioning table 82, a spindle assembly 84, and a controller 86. The X-Y-Z positioning table 82 is coupled to the base 80 and provides the ability to retain the cylinder block 20 and to selectively position the cylinder block 20 relative to the spindle assembly 84. The spindle assembly 84 includes motor 88 having a rotating spindle 90 and a cutting bit 92 coupled to the spindle 90. The controller 86 may include a display 94 for communicating graphical information to a user, a keyboard 96 for allowing a user to input information into the controller 86, and internal memory for storing a plurality of operational parameters which control the operation of the X-Y-Z positioning table 82 and the spindle assembly 84. Specifically, the motor 88 is controlled to operate the cutting bit 92 at a predetermined rotational speed, while the X-Y-Z positioning table 82 is controlled to selectively engage the cylinder block 20 and the cutting bit 92 to thereby effectuate the desired dimensional modifications of the air passage 26. The aforementioned machine tool arrangement may comprise any number of commercially available machine tools having the fundamental features described above, including but limited to such machine tools available from Fadal Manufacturing of Chatsworth, Calif., Haas Automation, Inc. of Oxnard, Calif., and Milltronics Manufacturing of Waconia, Minn.

Figure 12:
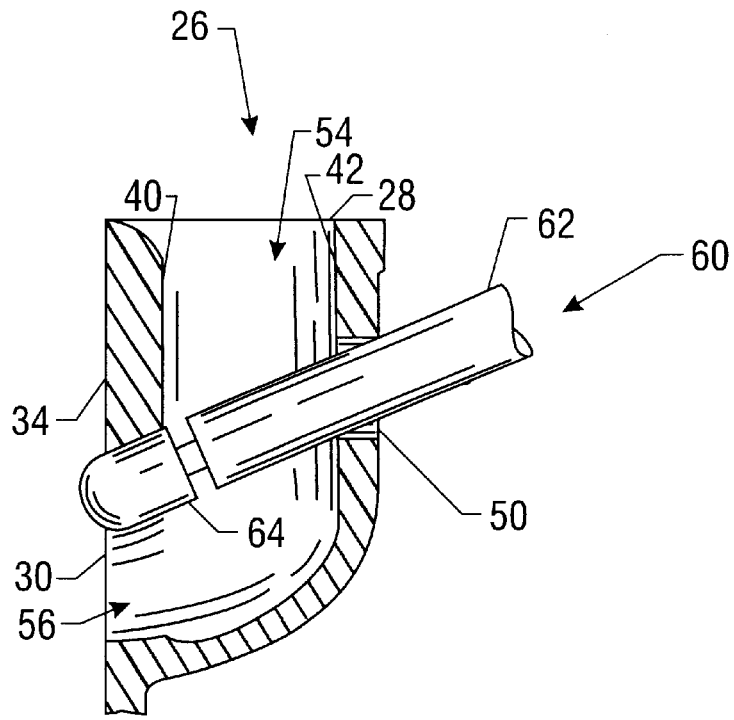
FIGS. 12–14 are partial sectional views illustrating the cylinder air passage shown in FIG. 6 with a modification tool inserted through an access aperture for modifying the generally horizontal lower portion of the air passage.
Figure 13:
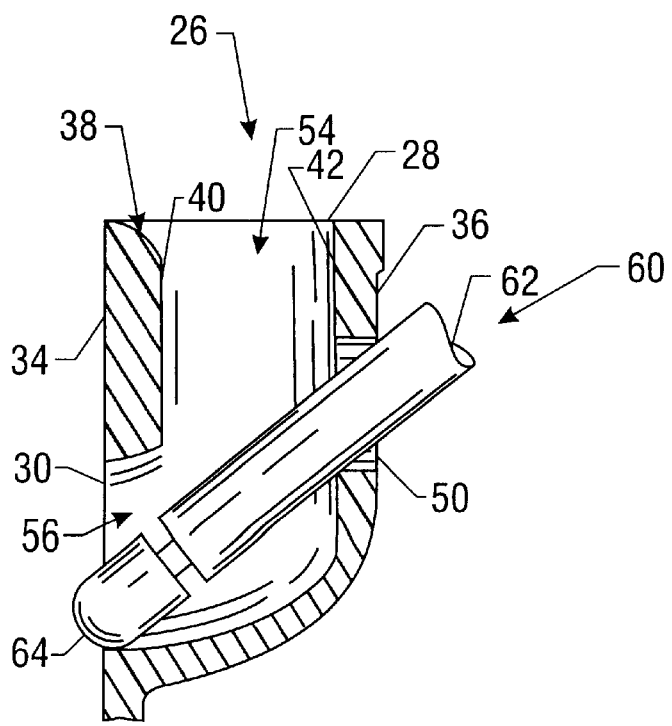
Figure 14:
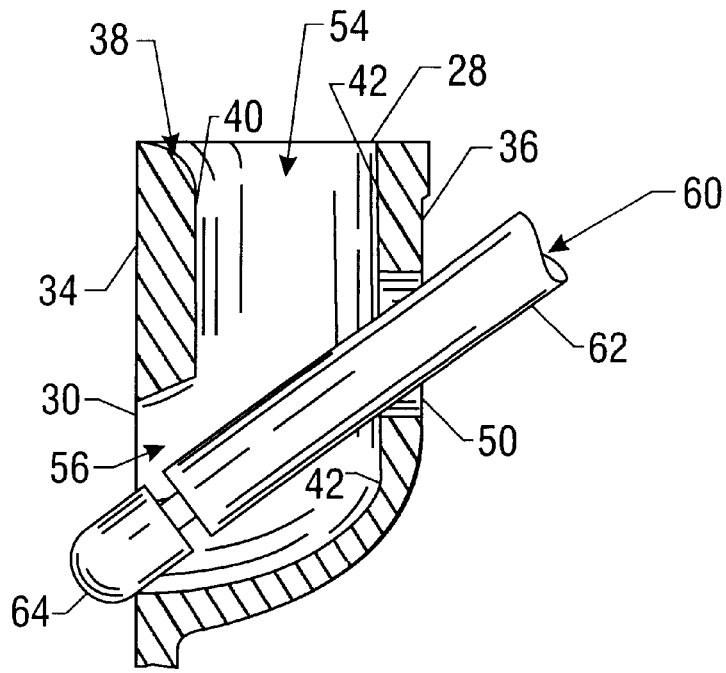

With specific reference to FIGS. 7–11, the automated modification tool 60 can effectively modify the upper portion 54 of the air passage 26 by extending through the entrance aperture 28 and traversing within the upper portion 54 so as to selectively and accurately modify the upper regions of the inner passage surface 40 and outer passage surface 42. Referring to FIGS. 12–14, the automated modification tool 60 can effectively modify the lower portion 56 of the air passage 26 by extending through the access aperture 50 and traversing within the lower portion 56 so as to selectively and accurately modify the lower regions of the inner passage surface 40 and outer passage surface 42. It is to be noted that, when designating the automated modification tool as an electrical discharge machining device and/or a laser-based machining device, it may not be necessary to physically insert these devices through the entrance aperture 28 or access aperture 50 in order to effectuate the desired modification. In such a case, the automated modification tool may simply be aimed through the entrance aperture 28 and/or access aperture 50 to direct the electrical discharge and/or laser into the air passage 26.

Figure 15:
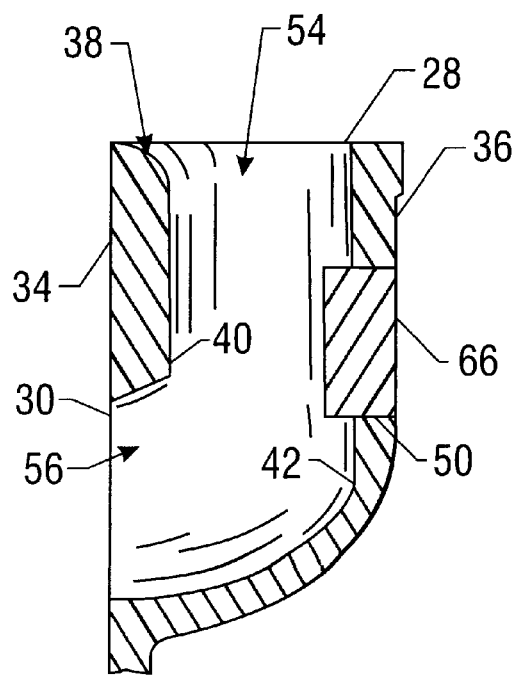
FIG. 15 is a partial sectional view of the cylinder air passage shown in FIG. 6 after modification having a plug inserted into the access aperture for the purpose of closing the access aperture.
Figure 16:
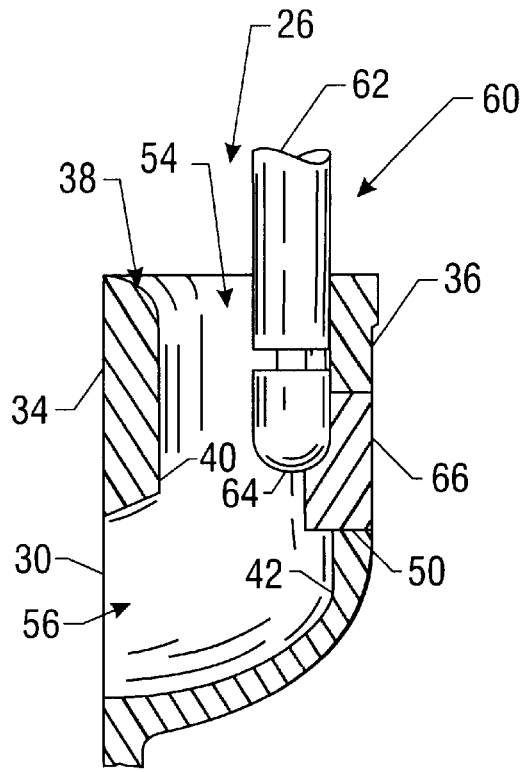
FIG. 16 is a partial sectional view of the cylinder air passage shown in FIG. 6 with a modification tool extending into the entrance aperture of the air passage for modifying the plug such that it matches the contour of the air passage.
Figure 17:
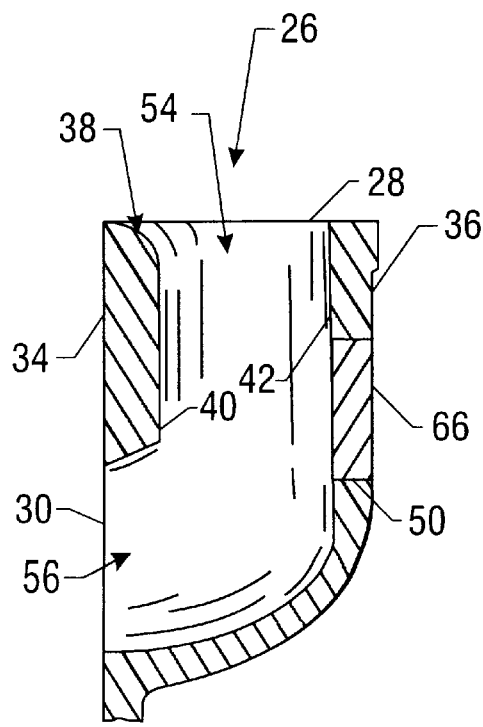
FIG. 17 is a partial sectional view of the cylinder air passage shown in FIG. 6 after modification according to the method of the present invention.

Referring now to FIG. 15, the step of sealing the access aperture 50 may be accomplished, by way of example, by fixing a plug 66 within the access aperture 50. Although the plug 66 and access aperture 50 are shown having generally smooth surfaces which engage together to seal the access aperture 50, it is hereby anticipated to provide these engagement surfaces in any of a host of different configurations suitable for facilitating the formation of a proper seal. For example, the access aperture 50 and plug 66 may be equipped with textured engagement surfaces, grooved engagement surfaces, angled engagement surfaces, threaded engagement surfaces, or engagement surfaces having raised ring members. In addition, the seal may be formed or supplemented through the use of such known techniques as soldering, brazing, or welding the plug 66 within the access aperture 50. It is also contemplated to fix the plug 66 within the access aperture 50 by applying adhesive to the engagement surfaces.

As evident from the foregoing, the present invention provides the desired improvement in the art by providing the above-described method and apparatus for enhancing performance in two-stroke engines. The present invention provides the ability to modify the airflow characteristics of the air passages associated with a cylinder to achieve a desired performance enhancement, including but limited to: (1) increasing the horsepower of the engine; (2) increasing the torque of the engine; (3) increasing the volume of air flowing into the cylinder; (4) restricting the volume of air flowing into the cylinder; (5) directing the flow of air and/or an air-fuel mixture into predetermined areas within the cylinder; and (6) altering the timing when the piston opens and closes the exit aperture of the air passage. Moreover, in one embodiment, the process of modifying the inner dimension of the air passage is fully automated such that the desired modifications may be performed in a relatively short period of time. Reducing the time required to perform such modifications advantageously minimizes the labor costs associated with increasing the horsepower of the engine. Moreover, automating the process of modifying the air passage under the direction of a computer program having predetermined operational characteristics ensures consistency during manufacturing for highly accurate and repeatable results.

The instant invention has been disclosed in connection with specific embodiments. However, it will be understood by those skilled in the art that variations of the illustrated embodiment may be undertaken without departing from the spirit and scope of the invention.

What is claimed is:

1. A method of enhancing the performance of an engine having a cylinder, an air passage in fluid communication with said cylinder, and an exterior wall forming one boundary of said air passage, comprising the steps of:
  (a) forming an access aperture in said exterior wall;
  (b) modifying the airflow characteristics of the air passage to produce a predetermined engine performance enhancement; and
  (c) closing said access aperture in said exterior wall.

2. The method as set forth in claim 1 and further, step (b) including the further sub-step of modifying the internal dimensions of said air passage with a modification tool.

3. The method as set forth in claim 1 and further, step (b) including the further sub-step of modifying said internal dimensions of said air passage such that said predetermined engine performance enhancement comprises at least one of increasing the horsepower of said engine, increasing the torque of said engine, increasing the volume of air flowing into said cylinder, restricting the volume of air flowing into said cylinder, directing the flow of air into a predetermined area within said cylinder, and altering the timing of the injection of air into said cylinder.

4. The method as set forth in claim 2 and further, step (b) including the further sub-step of providing said modification tool as an automated modification tool.

5. The method as set forth in claim 4 and further, step (b) including the further sub-step of operating said automated modification tool according to a computer program having predetermined operational parameters for controlling said automated modification tool.

6. The method as set forth in claim 5 and further, step (b) including the further sub-step of providing a positioner for selectively positioning said automated modification tool relative to said engine to thereby modify said air passage according to said predetermined operational parameters of said computer program.

7. The method as set forth in claim 2 and further, step (b) including the further sub-step of providing said modification tool as a manual modification tool.

8. The method set forth in claim 1 and further, step (a) including the further sub-step of forming said access aperture as one of round, square, rectangular, oval, and elliptical in shape.

9. The method set forth in claim 1 and further, step (a) including the further sub-step of: forming said access aperture with one of a drill, a cutter, and a laser.

10. The method set forth in claim 4 and further, step (b) the further sub-steps of:
  providing said automated modification tool as a machining instrument; and
  inserting said machining instrument through said access aperture to modify the internal surface of said air passage.

11. The method set forth in claim 10 and further, step (b) including the further sub-step of providing said machining instrument as one of an end mill, a drill bit, a boring tool, and a reamer.

12. The method set forth in claim 4 and further, step (b) including the further sub-step of providing said automated modification tool as an electrical discharge machining instrument.

13. The method set forth in claim 4 and further, step (b) including the further sub-step of providing said automated modification tool as a laser.

14. The method set forth in claim 1 and further, step (c) including the further sub-step of fitting a plug into said access aperture.

15. The method set forth in claim 14 and further, step (a) including the further sub-step of providing said access aperture with a size smaller than said plug; and step (c) including the further sub-step of inserting said plug into said access aperture to produce an interference fit therebetween.

16. The method set forth in claim 14 and further, step (a) including the further sub-step of providing said access aperture with a textured inner surface; and step (c) including the further sub-step of providing said plug with a textured surface.

17. The method set forth in claim 14 and further, step (a) including the further sub-step of forming said access aperture with at least one groove; and step (c) including the further sub-step of forming said plug with at least one groove for interlocking with said at least one groove of said access aperture.

18. The method set forth in claim 14 and further, step (a) including the further sub-step of forming said access aperture with an angled inner surface; and step (c) including the further sub-step of forming said plug with an angled outer surface which engages against said angled inner surface of said access aperture.

19. The method set forth in claim 14 and further, step (a) including the further sub-step of forming said access aperture with at least one raised ring member; and step (c) including the further sub-step of forming said plug with at least one raised ring member for engaging with said at least one raised ring member of said access aperture.

20. The method set forth in claim 14 and further, step (c) including the further sub-step of soldering said plug in place within said access aperture.

21. The method set forth in claim 14 and further, step (c) including the further sub-step of brazing said plug in place within said access aperture.

22. The method set forth in claim 14 and further, step (c) including the further sub-step of welding said plug in place within said access aperture.

23. The method set forth in claim 14 and further, step (c) including the further sub-step of applying adhesive to maintain said plug in place within said access aperture.

24. The method set forth in claim 14 and further, step (a) including the further sub-step of forming said access aperture with a threaded inner surface; and step (c) including the further sub-step of forming said plug with a threaded outer surface for being threadably received within said access aperture.

25. The method set forth in claim 14 and further, including the further step of modifying said plug with said automated modification tool such that said plug is flush with the inner surface of said air passage and flush with said outer surface of said exterior wall.

26. A method of modifying a stock two-stroke engine for enhanced performance, comprising the steps of:
   (a) forming an access aperture in an air passage which delivers air to a cylinder;
   (b) modifying the airflow characteristics of said air passage to produce a predetermined engine performance enhancement; and
   (c) closing said access aperture.

\* \* \* \* \*